United States Patent [19]

Randolph

[11] 4,263,010

[45] Apr. 21, 1981

[54] CONTROL METHOD AND APPARATUS FOR CRYSTALLIZER PROCESS CONTROL

[75] Inventor: Alan D. Randolph, Tucson, Ariz.

[73] Assignee: University Patents, Inc., Norwalk, Conn.

[21] Appl. No.: 90,019

[22] Filed: Oct. 31, 1979

[51] Int. Cl.$^3$ .................... G01N 15/02; B01D 9/00
[52] U.S. Cl. ........................... 23/230 A; 364/500; 364/502; 422/62; 422/245
[58] Field of Search ............ 23/230 A; 422/62, 245, 422/252, 253; 364/500, 502, 105, 106; 127/60

[56] References Cited

U.S. PATENT DOCUMENTS

| | | | |
|---|---|---|---|
| 3,725,127 | 4/1973 | Retali et al. | 23/230 A |
| 3,961,904 | 6/1976 | Bennett | 422/253 |
| 4,009,045 | 2/1977 | Petri | 23/230 A |
| 4,056,364 | 11/1977 | Dmitrovsky et al. | 422/253 |
| 4,155,774 | 5/1979 | Randolph | 23/230 A |

OTHER PUBLICATIONS

Savas, "Computer Control of Industrial Processes," pp. 39–52, McGraw-Hill, ©1965 (AU 173).

*Primary Examiner*—Ronald Serwin
*Attorney, Agent, or Firm*—Mason, Kolehmainen, Rathburn & Wyss

[57] ABSTRACT

A control method and apparatus is provided for the on-line control of crystallizer apparatus and the like to maintain predetermined operating parameters including crystal size distribution and growth rate to achieve stable, predetermined optimum continuous crystallizer operation for optimum crystal product output and purity and to avoid process transients, undesirable cycling behavior, system malfunctions and crystallizer downtime. The control method and apparatus develops on-line control signals for the process control of predetermined manipulated process variables in a closed-loop fashion. The control signals are obtained by the on-line measurement of a preconditioned, classified sample of the population distribution of the crystallizer. A zone sensing or light scattering particle analyzer is utilized by the on-line control apparatus to provide population distribution data to the control apparatus. The control apparatus determines various process control variables from the population data and provides control signals to the various manipulated variable control devices to maintain or set process conditions to achieve the desired conditions as measured by the controlled and measured variables in accordance with the control method and apparatus. The control variables developed via population distribution data include nuclei density, nucleation rate, nuclei density/crystallizer slurry density, growth rate, total number of crystals per unit volume, population average size, etc ... The manipulated process variables of the crystallizer include fines removal rate if a fines removal loop is present, fines loop dissolver control by solvent addition, feed rate of supersaturated input, fines removal size range, pH adjustment to the crystallizer or the fines loop dissolver, crystallizer mixing agitator rate, addition rate of chemical modifiers, and seed addition.

19 Claims, 4 Drawing Figures

CONTROL METHOD AND APPARATUS FOR CRYSTALLIZER PROCESS CONTROL

BACKGROUND OF THE INVENTION

1. Field of the Invention

The present invention relates generally to on-line process control apparatus and methods and more specifically to an on-line control method and apparatus for the predetermined process control of a crystallizer to achieve optimum, desired continuous crystallizer process characteristics.

2. Description of the Prior Art

Various crystallizer apparatus and the associated crystallizer process behavior are discussed in U.S. Pat. Nos. 4,025,307 to A. D. Randolph et al, 3,873,275 to R. C. Bennett and 3,961,904 to R. C. Bennett; "Crystal Size Distribution Dynamics In A Classified Crystallizer: Part I", A. D. Randolph et al, 23 *AIChE Journal* No. 4 pp. 500–510, July 1977; "Crystal Size Distribution Dynamics in a Classified Crystallizer: Part II", J. R. Beckman et al, 23 *AIChe Journal* No. 4, pp. 510–520, July 1977; and *Theory of Particulate Processes*, A. D. Randolph et al, Academic Press, New York, 1971.

As discussed at various portions of the aforementioned prior art, crystal size distribution is an important parameter of an operating crystallizer and much effort has been directed toward reducing crystal size distribution transients and eliminating crystal size distribution instability in industrial crystallizers in order to produce a crystal product within the desired size range and at a desired production rate of efficiency. Extreme crystal size distribution cycling can cause production losses due to off-specification product, overload of associated equipment and equipment fouling. Transients of crystal size distribution are known to be caused by such outside influences to the crystallizer as dilution addition, feed rate, etc . . . while unstable crystal size distributions result from the interaction of system kinetics with the particular crystallizer configuration. Low order cycling of crystal size distribution instability is caused by the fines destruction and classified product removal in a stable low-order region of nucleation vs. supersaturation response.

The arrangements in U.S. Pat. Nos. 3,873,275 and 3,961,904 are directed to regulation of both the size and quantity of crystal fines removed from a slurry body undergoing crystallization.

The AIChE Journal article entitled "Crystal Size Distribution Dynamics In A Classified Crystallizer: Part I" is directed to an experimental and theoretical study of cycling in a potassium chloride crystallizer with simulation of unstable operation with a dynamic model.

The AIChE Journal article entitled "Crystal Size Distribution Dynamics In A Classified Crystallizer: Part II" discusses the simulated control of crystal size distributon for a crystallizer equipped with a fines destruction system and fines removal product classifer. A computer simulator entitled "CYCLER" was developed to simulate the dynamics and control of crystallizers equipped with fines destruction, clear liquor advance, and product classification. The simulator was used extensively throughout the study in the analysis and experimental work and for the development of theoretical control philosphies. A control algorithm was proposed utilizing the fines destruction to product withdrawal ratio as the manipulated variable and the nuclei density as a control variable. A simulation of the control algorithm as a subroutine in the simulation computer was implemented to test the feasibility of the control algorithm and theoretically establish that by controlling nuclei density, crystal size distribution cycling could also be controlled. To verify the computer simulation of the process dynamics of the crystallizer, nuclei densities in the study were obtained from an experimental crystallizer in the laboratory by taking a slurry sample from the fines destruction loops, drying the sample, resuspending the particles in an electrolytic solution, counting the particles with an electronic particle counter, calculating population densities and performing a linear regression analysis on a plot of the log of the population density versus particle size. Nuclei density was then determined as the ordinate intercept of the regressed line. The batch procedure requires a number of hours or days and thus this off-line complicated procedure could not be used to generate data needed for the control of an on-going system.

In U.S. Pat. No. 4,025,307, crystallization properties of human urine in a crystallizer were analyzed to determine renal stone formation characteristics of the sampled humans. A sample output of the crystallizer was analyzed by a particle counter and a computing module to determine the nucleation rate. The nucleation rate was found to be able to distinguish normal urine samples from those from people who were considered renal stone forming candidates. The data from the particle counter provided population density information in various size ranges. A plot of the size ranges and the log of the population density for each size range from the particle counter data were utilized to provide a best-fit line through the calculated data points to provide the nuclei density, nucleation rate and growth rate as determined by the extrapolation of the best-fit line, the slope of the line and the intercept with the log n axis.

While the aforementioned studies and measurement systems are useful in understanding the dynamics and operation of a crystallizer, and generally serve their intended purpose, the prior art fails to provide an on-line control system for the on-line, real-time control of a crystallizer to maintain predetermined operating parameters and to achieve stable predetermined optimum, continuous crystallizer operation for optimum crystal product output or characteristics and to avoid process transients and undesirable cycling behavior.

OBJECTS AND SUMMARY OF THE INVENTION

Accordingly, it is a principal object of the present invention to provide an on-line control method and apparatus for the control of crystallizer apparatus to maintain predetermined operating parameters in the crystallizer and to develop on-line control signals for the process control of predetermined manipulated process variables wherein the control signals are obtained by the on-line measurement of a preconditioned, classified sample of the population distribution of the crystallizer.

It is another object of the present invention to provide on-line control method and apparatus in a crystallizer for the dynamic determination of the growth rate in the crystallizer and utilize the growth rate to generate control signals to control operation of the feed addition rate to the crystallizer to thereby maintain the growth rate within a predetermined optimum range or below a predetermined maximum.

It is another object of the present invention to provide control apparatus for the control of a crystallizer wherein the control apparatus determines the nuclei density per unit mass of crystals in the crystallizer vessel and develop a control signal based on the dynamic measurement of the nuclei density per unit mass of crystals in the vessel to control the fines population distribution in a fines destruction loop to thereby maintain the nuclei density per unit mass of crystals in the vessel within a predetermined range of a desired set point for optimum dynamic operation of the continuous crystallizer process.

It is a further object of the present invention to provide an on-line, dynamic control of a continuous crystallizer in a real-time manner by determining the crystal density distribution in a predetermined size range in accordance with a predetermined dynamic control method to accurately determine the dynamic operating parameters of the crystallizer and utilize the determined dynamic operating parameters in an on-line closed loop basis to control various manipulated variables as process parameters of the crystallizer.

Briefly and in accordance with one embodiment of the present invention, the objects of the present invention are efficiently achieved by providing a control method and apparatus for the control of crystallizer apparatus to maintain predetermined operating parameters including crystal size distribution and growth rate to achieve stable, predetermined, optimum continuous crystallizer operation for optimum crystal product output and purity and to avoid process transients, undesirable cycling behavior, system malfunctions and crystallizer downtime. The control method and apparatus develops on-line control signals for the process control of predetermined manipulated process variables in a closed-loop fashion. The control signals are obtained by the on-line measurement of a preconditioned, classified sample of the population distribution of the crystallizer. A zone sensing or light scattering particle analyzer is utilized by the on-line control apparatus to provide population distribution data to the control apparatus. The control apparatus determines various process control variables from the population data and provides control signals to the various manipulated variable control devices to maintain or set process conditions to achieve the desired conditions as measured by the controlled and measured variables in accordance with the control method and apparatus. The control variables developed via population distribution data include nuclei density, nucleation rate, nuclei density/crystallizer slurry density, growth rate, total number of crystals per unit volume, population average size, etc . . . . The manipulated process variables of the crystallizer include fines removal rate if a fines removal loop is present, fines loop dissolver control by solvent addition, feed rate of supersaturated input, fines removal size range, pH adjustment to the crystallizer or the fines loop dissolver, crystallizer mixing agitator rate, addition rate of chemical modifiers and seed addition.

Other objects, features, and advantages of the present invention will become apparent from the following detailed description taken in conjunction with the accompanying drawing.

DETAILED DESCRIPTION OF THE PREFERRED EMBODIMENT

Figure 1:
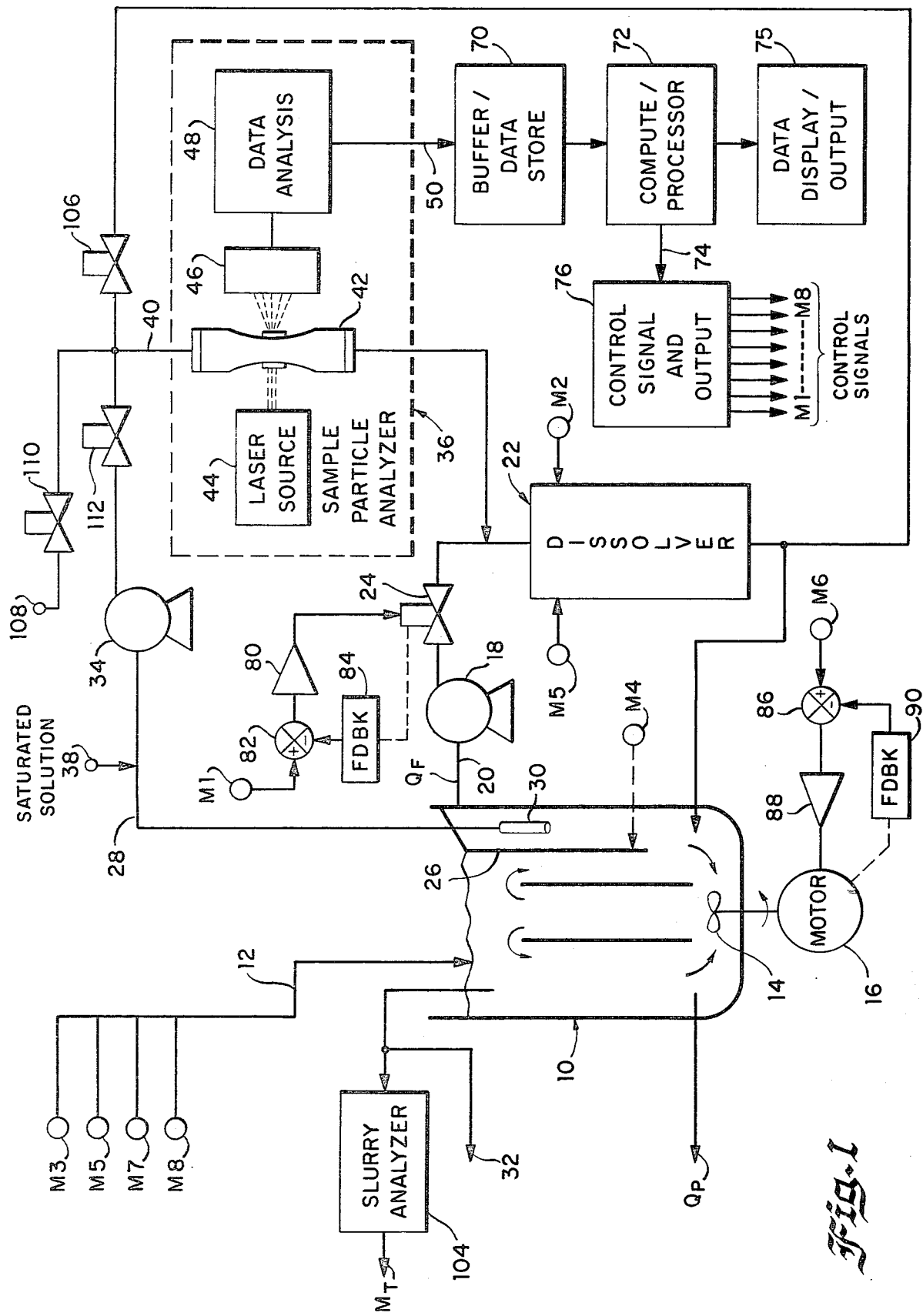
FIG. 1 is a process schematic and block diagram representation of the control method and apparatus for the control of a crystallizer in accordance with the principles of the present invention.

Referring now to FIG. 1, there is shown in a schematic and functional process representation an industrial crystallizer and various control arrangements in accordance with the control apparatus and method of the present invention. The industrial crystallizer of FIG. 1 utilized to describe the present invention is commonly referred to and characterized as a mixed-suspension mixed-product removal (MSMPR) crystallizer of the general type discussed in the aforementioned *Theory Of Particulate Processes*. The crystallizer includes a crystallizer tank 10 into which a supersaturated solution of mother liquor is added through an input feed system generally referred to at 12. For example, the crystallizer in one application is a potassium chloride crystallizer and M3 designates the feed rate of mother liquor into the crystallizer tank.

In accordance with the dynamic operation and control of the crystallizer process, the crystal product grows in the slurry contained in the crystallizer tank 10 and the crystal product is removed as designated at $Q_p$ by a conventional industrial product withdrawal system.

The slurry contents of the crystallizer is agitated by an impeller 14 driven by a variable speed motor 16 with an agitation rate in RPM designated as M6. An overflow system (not shown) is provided in specific crystallizer arrangements and closed system operation is commonly practiced in industrial crystallizers with the overflow being recycled, resaturated and feed back into the crystallizer tank 10.

The specific crystallizer illustrated in FIG. 1 is provided with a fines removal system including a fines removal pump 18 connected to a fines removal line 20 and supplying the fines removal stream to a solvent dissolver 22. The fines removal pump 18 operates at a fines removal rate $Q_F$ in gallons/minute. The fines removal pump 18 in the preferred embodiment is a centrifugal pump with a pump rate determined by the pressure established by a control valve 24. The degree or extent of fines dissolving in the solvent dissolver 22 is controlled by the solvent addition rate designated as M2. The output of the fines dissolver is returned to the crystallizer tank 10.

It should be understood that the fines removal pump 18 in another embodiment is a variable rate pump driven by a variable speed motor. Further, the dissolver 22 in another embodiment is a thermal dissolver.

The upper size range of cut off of the fines removal system is controlled by an adjustable baffle 26 functioning as a fines settler. The cross-sectional area of the baffle 26 determines the upper size range of the fines removal stream in accordance with a Stoke's settling law relationship. For example, as the cross-sectional area of the baffle 26 is increased, the upper size range of the fines removal stream decreases.

The control method and apparatus of the present invention includes a sample withdrawal stream 28 for the measurement of particle population distribution characteristics that are utilized by the control apparatus and method of the present invention to develop control signals to control the dynamic on-line operation of the crystallizer as will be explained in more detail hereinafter.

In a preferred embodiment, the sample stream is withdrawn by a passive sample conditioner 30 disposed within the baffle separator arrangement 26. In a specific embodiment the passive sample conditioner 30 is an inverted tube. The passive sample conditioner provides a means of determining the upper size range of the sample stream below that and independent of the baffle 26 for the fines removal system. The upper size range is referred to as a cut size.

It should be understood that the present invention also is applicable to crystallizer processes wherein no fines removal system is utilized. Thus, where no fines removal system is provided in the crystallizer, a sample withdrawl stream 32 is utilized in combination with a hydroclone or other suitable sample conditioner arrangement to provide the appropriate conditioned, classified sample stream to the control apparatus of the present invention.

In either case, the conditioned classified sample stream is provided through a sample stream pump 34 to a sample particle analyzer 36 of the control apparatus of the present invention at a sample analysis input 40. In accordance with an important aspect of the present invention, the sample stream 28 is diluted at 38, for example, by the addition to the sample stream 28 of saturated mother liquor solution to provide a predetermined concentration of crystal particulate density by weight for optimum data analysis by the sample particle analyzer 36. For example, a crystal particulate density of approximately 0.1% by weight has been found to be the optimum concentration for data analysis in a specific embodiment.

In a specific embodiment, the sample particle analyzer 36 is a light scattering particle analyzer, for example based on the MICROTRAC ® particle analyzer available from the Leeds and Northrup Company. The light scattering particle analyzer utilizes forward, low angle laser light scattering principles for particle population distribution analysis. Analysis of particles in the size range of 2 to 170 μm at concentrations of up to about 0.1% by volume are feasible for the practice of the present invention with the MICROTRAC analyzer, with unrestricted sample flows up to 30 gallons/minute making the analyzer suitable for industrial application.

The conditioned, classified sample stream at 40 passes through a sample flow cell 42 of the particle analyzer 36 and the sample flow is then returned to the fines removal stream at the input to the dissolver 22. The particle analyzer 36 includes a laser source 44 directed through a "window" of the sample flow cell 42. Thus, the particles in suspension in the sample stream pass through the flow cell 44 and each particle scatters the light in a forward direction with an intensity and an angle which depends on the particle size; the particle analyzer utilizing forward, low angle scattering of the laser source 44. The intensity of the scattered light at various angles is measured by an optical masking and sampling system generally designated at 46. The sample stream includes particles of various sizes in a predetermined range and the relative intensities at various angles are utilized by the particle analyzer 36 to yield a particle size distribution in a predetermined data output format.

Figure 2:
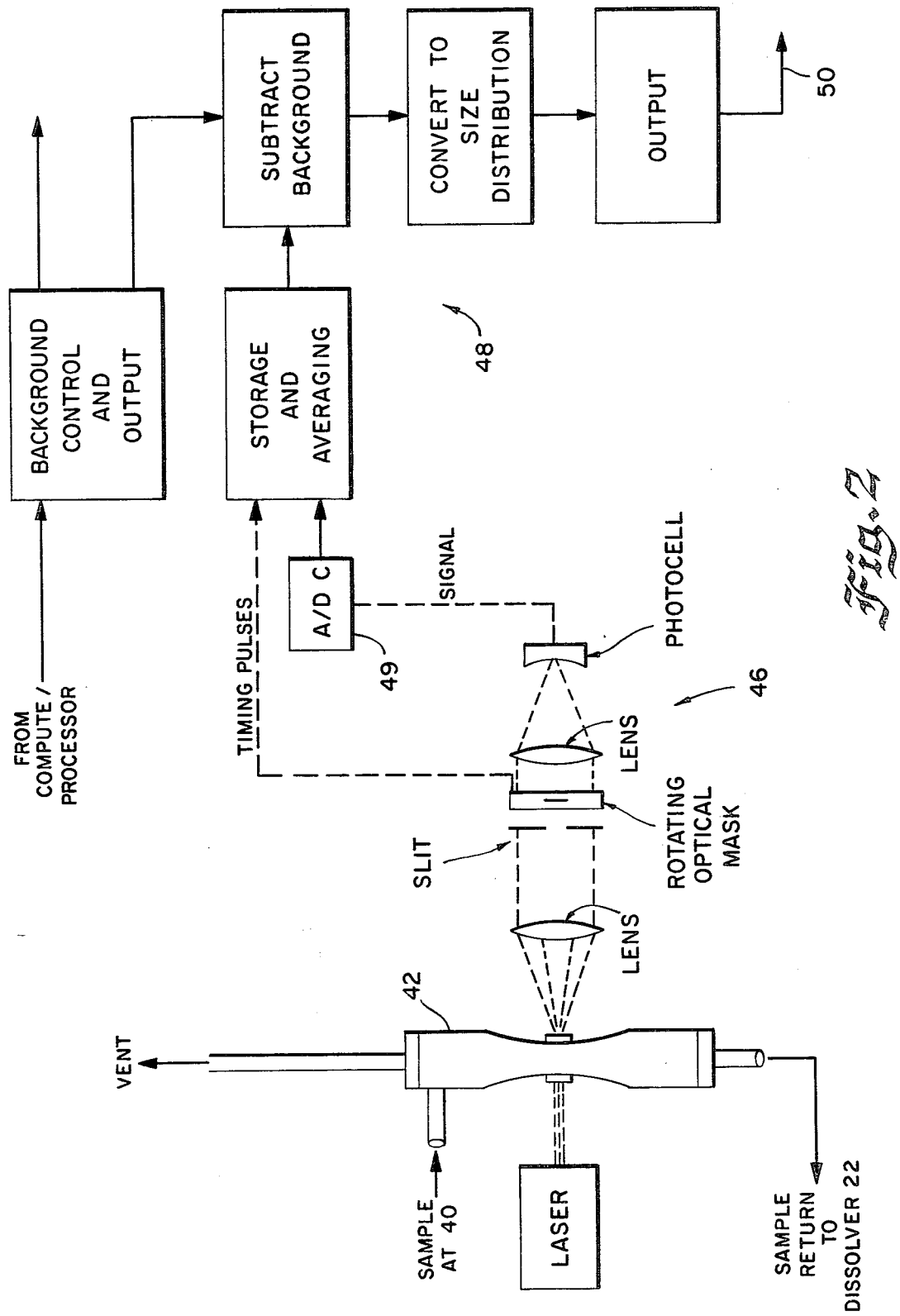
FIG. 2 is a block diagram and functional schematic representation of the details of a light scattering, particle analyzer apparatus utilized in the control method and apparatus of FIG. 1.

The light scattering data from the optical masking and sampling system 46 is output to a data analysis stage 48. The data analysis stage 48 digitally analyzes the data and provides a data output 50 including particle distribution data by particle size and overall sample flow particle data as will be explained in more detail hereinafter for use by the control apparatus of the present invention to perform estimated data analysis of the dynamic process parameters of the crystallizer. The particle analysis utilizes the relative intensity at various scatter angles to determine the sample particle distribution. Thus, the results are independent of sample time, flow velocity and particle concentration. In a preferred embodiment, the statistical accuracy of the particle analysis of the on-line control apparatus of the present invention is optimized if a reasonable sample time of one to five minutes is utilized and if the particle concentration is less than or equal to 0.1% by volume. Higher particle concentrations have been found to cause multiple scattering of the light output and deteriorated statistical accuracy. Reference is made to FIG. 2 for a more detailed description of the light scattering particle analyzer 36 of FIG. 1. An Analog to Digital converter 49 of the data analysis stage 48 of the particle analyzer converts the analog light scattered data from the optical masking and sampling system 46 to digital data for analysis.

In other specific embodiments, the particle analyzer 36 is an electrical zone sensing particle analyzer such as a model T Coulter Counter. The zone sensing particle analyzers have somewhat higher accuracy than the light scattering particle analyzer since the zone sensing instruments effectively count each particle by producing a pulse. However, the use of light scattering versus zone sensing analyzers involves a trade-off between operational difficulties and precision since the zone sensing instruments are subject to plugging and fouling in industrial environments due to the small opening and restricted flow inherent in zone sensing. Further, the zone sensing instruments are more prone to electrical noise problems.

The output 50 of the light scattering particle analyzer 36 of FIGS. 1 and 2 in a specific embodiment provides the volume of particles in each of a predetermined number of particle size ranges as a weight distribution. In one arrangement, 13 size ranges from 2.8 to 176 μm are available with respective volume percentages and population per size range outputs. The particle analyzer 36 also provides particle concentration data in the flow sample and the mean size of the distribution. The output at 50 is a digital output for ease of data handling by the on-line control apparatus of the present invention.

In a specified preferred embodiment, the sample stream at 28 is conditioned and classified so that the upper cut size of the particles is approximately 150 to 200 μm.

In accordance with important aspects of the present invention, the data output 50 of the particle analyzer 36 is connected to the input of a buffer/data store stage 70 of the on-line control apparatus. The buffer/data store stage 70 is utilized to store the data output of the particle analyzer 36 for the use by a compute/processor stage 72 of the on-line control apparatus. In a specific embodiment the buffer/data store stage 70 is a KIM-1 Microprocessor and the compute-processor stage is an SPC-16 mini-computer available from General Automation.

The compute/processor stage 72 analyzes the particle distribution data of the sample flow from the particle analyzer 36 and utilizes predetermined program analysis steps, relationships, and analysis criteria to estimate dynamic process parameters of the crystallizer on a real-time, on-line basis. The compute/processor stage 72 outputs the estimated dynamic process parameters at 74 to a control signal and output stage 76 of the on-line control apparatus. The control signal and output stage 76 develops control signals MI-M8 for the on-line, reatime control of dynamic process parameters of the crystallizer by controlling manipulated process variables of the crystallizer to manipulate or control various controlled variables of the crystallizer dynamics. The effectiveness of the manipulated process variable to achieve the desired controlled process variable is determined by the compute/processor stage 72 of the on-line control apparatus from the particle data of the particle analyzer 36.

For example, in one control embodiment, the on-line control apparatus is utilized to estimate the growth rate G of the crystallizer. If the compute/processor 72 calculates an estimated real-time, dynamic growth rate G that is too high, for example, as compared to a desirable maximum growth rate that should not be exceeded so as to avoid plugging problems in the crystallizer, the control signal and output stage 76 at control signal output M3 changes the set point or rate of the feed addition at input 12 to reduce the feed addition rate of saturated mother liquor solution until the compute/processor stage 72 determines that the estimated dynamic growth rate G is within the desired, acceptable range. The compute/process stage 72 and the control signal and output stage 76 appropriately compensate for the time lag in the response of the crystallizer to changes in the commanded manipulated variables to avoid overshoots and instabilities in accordance with closed loop control systems as will be explained in more detail hereinafter. Further, the on-line control apparatus via stages 72 and 76 also provides appropriate time averaging of previous and present estimated dynamic parameters to provide stable command signals to the manipulated process variable control arrangements as also will be explained in more detail hereinafter.

In another example of the on-line control of dynamic process parameters by the control of manipulated process variables, the compute/processor stage 72 estimates the real-time, dynamic ratio of nuclei density/slurry density ($n^o/M_T$) in the crystallizer. If the estimated $n^o/M_T$ is not within the desirable operating range, the control signal and output stage 76 develops command signals at the M1 and M2 outputs, for example, to modify the fines removal rate (M1) and/or the solvent addition rate (M2) to the fines dissolver 22. If the process parameter $N^o/M_T$ is too high, for example, the signals M1 and M2 will increase the rate of solvent addition at M2 and increase the rate of fines removal via pump 18. Referring to the fines removal system, the control valve 24 that controls the rate of the fines removal system by variable pressure at the centrifugal pump 18 is controlled in a closed loop arrangement by amplifier 80 and the input command signal M1 through a summing junction 82. The summing junction 82 also includes a feedback input from a feedback stage 84. The feedback stage 84 includes a feedback transducer to measure the pressure at the control valve 24. Thus, the input command signal M1 controls the fines removal rate. In effect, a casade control loop is formed with the inner control loop of the fines removal rate being controlled at the control valve 24 and the second outer control loop formed by the estimation of the process parameter $n^o/M_T$ from the sample data of the particle analyzer; the process parameter $n^o/M_T$ being used to generate a changing M1 control signal as a command input to the fines removal system.

Thus, it can be seen that the on-line control apparatus controls the dynamic process variables on an on-line, closed-loop, real time basis by providing command signals to manipulated process variable controls or closed-loop arrangements.

Referring to the variable speed motor 16 that controls the rate of the impeller 14, the control signal M6 (manipulated variable of agitator RPM) is connected to one input of a summing junction 86. The output of the summing junction is connected through an amplifier 88 to control the speed of the impeller motor 16. The speed of the motor 16 is measured by a feedback transducer network 90 connected to a second input of the summing junction 86. Thus, the control of the impeller motor 16 is a closed loop arrangement with the input command signal M6 controlling the operating point or set point of the impeller motor 16. The modification of the agitator rate M6 is utilized to control the crystallizer process when the on-line control appratus determines by means of the dynamic process parameters that a change in agitation rate is required or desirable.

The control apparatus also includes a data display/output stage 75 in a specific embodiment to provide monitoring and display of process parameter to an operator.

Considering now the details of the particle analysis and parameter estimation performed by the compute/processor stage 72 to estimate dynamic crystallizer process variables and parameters, the compute/process stage 72 calculates the population density for selected particle size ranges from the respective volume fractions (weight distribution, fractional portions as a percentage of the total analyzed sample) obtained from the particle analyzer 36. An example of the data output by the particle analyzer 36 in a specific embodiment is shown in TABLE I (the data output of TABLE I is the available data although it should be understood that not all of the data is ncessarily used in the practice of the present invention):

TABLE I

| PARTICLE ANALYZER 36 OUTPUT DATA AT 50 | | | |
|---|---|---|---|
| CHANNEL | L($\mu$m) | $\Delta W$(%) | n |
| 13 | 176–125 | 24.4 | $.645 \times 10^o$ |
| 12 | 125–88 | 27.4 | $.29 \times 10^1$ |
| 11 | 88–62 | 21.8 | $.992 \times 10^1$ |
| 10 | 62–44 | 13.4 | $.227 \times 10^2$ |
| 9 | 44–31 | 6.0 | $.406 \times 10^2$ |
| 8 | 31–22 | 3.9 | $.106 \times 10^3$ |
| 7 | 22–16 | 1.1 | $.119 \times 10^3$ |
| 6 | 16–11 | 1.5 | $.649 \times 10^3$ |
| 5 | 11–7.8 | 0.0X | $.173 \times 19^4$ |
| 4 | 7.8–5.5 | 0.1 | $.692 \times 10^3$ |
| 3 | 5.5–3.9 | 0.0X | $.277 \times 10^5$ |
| 2 | 3.9–2.8 | 0.0X | $.111 \times 10^6$ |

TABLE I-continued

PARTICLE ANALYZER 36 OUTPUT DATA AT 50

| CHANNEL | L(μm) | ΔW(%) | n |
|---|---|---|---|
| 1 | 2.8- | 0.0X | .442 × 10⁶ |

(Values of n are listed for information purposes and are calculated by the compute/processor stage 72)

Figure 3:
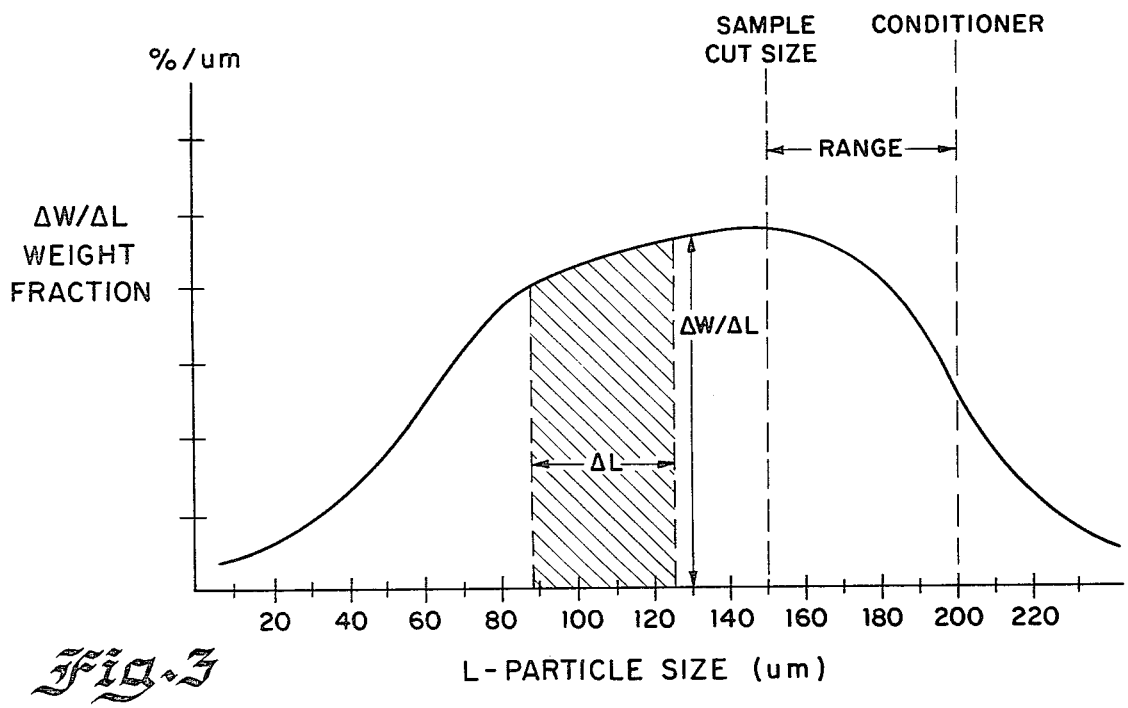
FIG. 3 is a graphic representation of fractional weight distribution of the particles in a conditioned sample of the control apparatus of FIGS. 1 and 2.

The weight fraction Δ W defines the percentage of the overall sample by weight contained in the particle size ranges listed in the Δ L column. For example, the particle size range of 125 to 88 mm includes 27.4% of the overall sample by weight; i.e., 27.4% of the total sample by weight is comprised by the particles in the size range between 88 and 125 μm. Referring now to FIG. 3, a representation of the weight distribution of the sample is illustrated as a weight fraction over the particle size range and as a function of particle size. As can be seen from FIG. 3, the sample conditioner removes almost all particles larger than the cut size beyond the cut size range of 150 to 200 μm.

The compute/processor stage 72 calculates particle population density values n for a predetermined number of the particle size ranges of the sample data of Table I at mean particle sizes within each respective particle size range from the equation:

$$n = \frac{\frac{\Delta w}{\Delta L} \cdot m_{TF}}{\rho \, k_v (L_{avg})^3} \quad (1)$$

where $\rho$ is the density of the crystals, $k_v$ is the shape factor of the crystals, $m_{TF}$ is the slurry density in gm/cc of the particle sample stream, and $L_{avg}$ is the geometric mean of the particle sizes bounded by the Δ L range. The slurry density $m_{TF}$ of the sample stream is available from the particle analyzer 36. Reference may be made to the aforementioned *Theory Of Particulate Processes*, chapters 2 and 4 for a more detailed discussion of particle distribution analysis and the derivation of the identity described by equation (1); specifically, see Chapter 2, pp. 19-21 and equation (2.3-13) on page 21.

In a preferred embodiment, the particle size range 125-176 μm is not utilized for the calculation of population density values even though an appreciable percentage of the size distribution is included in this range since the size range 125-176 μm overlaps the classifier cut-size range and is suspect as to statistical accuracy. Further, in accordance with a preferred embodiment of the present invention, particle size ranges comprising less than 5% of the total volume of the sample are not utilized for the determination of the population density since these size ranges including less than 5% of the volume of the crystals in the sample are not considered to be sufficiently reliable for the estimation of dynamic process parameters. Further, in a preferred embodiment, the particle size ranges utilized in calculating values of n start with the 88-125 μm range and continue through the lower size ranges until the first size range is encountered that includes less than 5% of the volume of the sample distribution. For practical purposes to practice the invention it is thought possible to obtain relatively meaningful data dy utilizing the particle size ranges with as low as 3% of the total volume but it is preferred to use those with at least 5% of the total volume.

Figure 4:
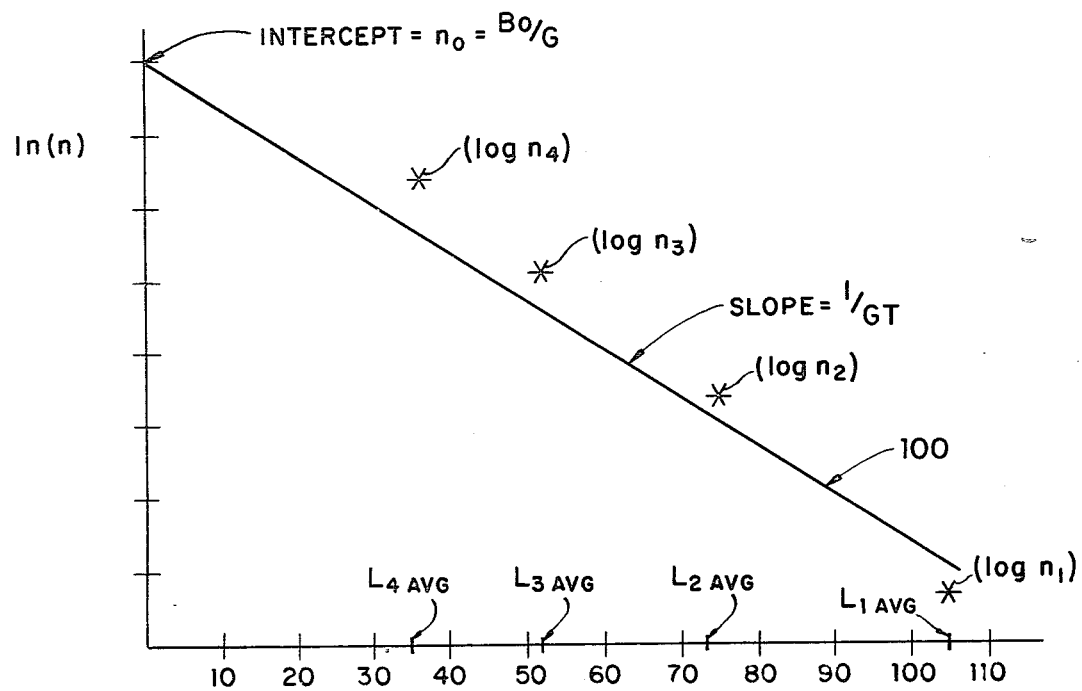
FIG. 4 is a data plot useful in illustrating the control method and apparatus of the present invention of FIG. 1.

Accordingly, by applying the predetermined criteria of the preferred embodiment of the present invention, only the particle size ranges 88-125, 62-88, 44-62, and 23-42 μm are utilized to calculate values of n from equations 1 based on the data of TABLE I. Referring to the calculated values of population density n as $n_1$ for the size range 88-125 μm, $n_2$ for 62-88 μm, $n_3$ for 44-62 μm and $n_4$ for 23-42 μm, the compute/processor stage 72 utilizes statistical analysis such as a least square, best-fit relationship to determine the best fit straight line from the data points (as natural logs):

$\log n_1, L_{1avg}; \log n_2, L_{2avg};$
$\log n_3, L_{3avg}; \log n_4, L_{4avg}.$ Referring now to FIG. 4, a representation of the best fit line 100 determined by the compute/processor stage 72 is shown along with the plotted data points from which the line 100 is obtained.

The compute/processor stage 72 then determines the slope of the line 100 and the ordinate intercept of the line 100 with the log n axis by extrapolating the equation of the line 100 beyond the range of the data points to the log n axis. The compute/processor stage 72 utilizes the slope of the line 100 to determine the growth rate G by defining the slope of the line 100 as $-1/GT_F$ where $T_F$ is the fines retention time as defined by the relationship:

$$T_F = V/(Q_P + Q_F + Q_O) \quad (2)$$

where V is the volume of the crystallizer tank 10, $Q_P$ is the product withdrawal rate, $Q_F$ is the fines withdrawal rate, and $Q_O$ is the overflow rate (if overflow is provided). The value of $T_F$ is calculated, stored, and modified by the compute/processor stage 72 as the various parameters are modified in accordance with a predetermined relationship as will be discussed hereinafter.

The intercept of the best fit line 100 with the log n axis defines the nuclei density $n^o = B^o/G$, the theoretical density of nucleus size crystals; i.e., newly created crystals. Thus, the compute/processor stage 72 determines as estimated quantities the dynamic process parameters: $n^o$ nuclei density; G growth rate; $B^o$ nucleation rate; and $T_F$ fines residence time. Reference may be made to the aforementioned *Theory Of Particulate Processes*, Chapter 4, for the theoretical analysis of the semilog plot of log n and L and population density relationship in a steady-state MSMPR crystallizer and U.S. Pat. No. 4,025,307 for an analysis of particle data to determine $n^o$, G and $B^o$.

The on-line control apparatus and method of the present invention determines the dynamic process parameters such as $N^o$, G, $B^o$ etc..., based on the steady-state analysis of the population distribution. However, the estimates of the dynamic parameters has been found to be relatively accurate, reliable and consistent even though the crystallizer is not in the steady-state. The accuracy of the dynamic process parameters as computed by the on-line control apparatus has been verified by actual sample measurements and analysis. The results show that the accuracy is within 5-20% of the absolute actual process parameter values in specific examples.

In accordance with important aspects of the present invention, the particle analysis of the classified sample from the fines stream has been found to provide accurate measurements of the crystallizer system parameters before a steady state has been reached by the crystallizer apparatus as well as during the steady state, and during transient conditions after a steady state condition has been reached by the crystallizer apparatus. Thus, the use of the on-line control apparatus is effective to optimize the stabilization of the crystallizer toward a steady-state between the time of crystllizer system start up and before a steady-state is reached. In a typical example, accurate on-line process measurements are obtained by the on-line control apparatus within 20 minutes after the start-up of the crystallizer as compared to the steady-state of the crystallizer apparatus being approximately 3–10 hours after system start-up. The early accuracy of the determined process parameters after start-up and before the steady-state is reached is thought to be due at least in major part to the fines residence time $T_F$ being much less than the residence time of the crystal product. For example, the fines residence time $T_F$ is $V/(Q_P+Q_F+Q_O)$ while the product residence time $T_P$ is $V/Q_P$. In one example of an industrial crystallizer, the fines residence time $T_F$ is 10 minutes while the product residence time $T_P$ is 3 hours due to the high rate $Q_F$ of fines removal and the relatively low rate $Q_P$ of product removal. Thus, the use of the sample measurements being within the fines range results in the on-line measurement of dynamic process parameters with a relatively short time duration (lag time) between the time of a command and the measured resultant response of the process parameters; i.e. the measured system response in growth rate for example to an input command (step function) is much faster as measured by the fines particles than would be the case if the growth rate were determined from the crystal product.

As discussed hereinbefore, the compute/processor stage 72 of the on-line control apparatus utilizes the fines residence time $T_F$ to calculate the growth rate G since the slope of the best-fit line 100 is equal to $-1/GT_F$.

Thus, to optimize stability and control of the crystallizer, the manner in which $T_F$ is recalculated and utilized by the compute/processor state 72 is of great significance. For example, if the on-line control apparatus determines that the growth rate G is too high and requires correction, the on-line control apparatus in a specific embodiment by means of the control signal and output stage 76 via signal output M1 decreases the fines removal rate $Q_F$. If the compute/processor stage 72 immediately recalculated and utilized an increased $T_F$ from the new commanded $Q_F$ set point, the growth rate G would immediately be calculated as having decreased instantaneously with no change in the sample data and of course before the growth rate has really changed, since the growth rate cannot change instantaneously. Thus, a time-lag must be introduced in the updated value of $T_F$ to be used by the compute/processor stage 72 in calculating the growth rate G.

Accordingly, the compute/processor stage 72 provides a time lag based on the response of a first order system based on the fines residence or response time. For example, the time constant $T_F$ could be updated by the compute/processor stage 72 as follows:

$$T_{F(n+1)} = T_{F(n)} + \Delta T_F (1 - \exp(-t^1/T_F)) \qquad (3)$$

where $t^1$ represents the time since a change $\Delta T_F$ in the fines residence time is applied, $T_{F(n+1)}$ represents the current value for calculating growth rate, $T_{F(n)}$ represents the immediately preceding value before the change $T_F$ was applied as measured by $Q_F$, and $T_F$ in the term $t^1/T_F$ can be $T_{F(n+1)}$ or a constant in the order of magnitude of the calculated $T_F$ factors.

In various embodiments of the on-line control apparatus, as determined by the particular crystallizer to be controlled, the following process parameters are calculated and controlled; nuclei density, $n^o$; nucleation rate, $B^o$; nuclei density/unit mass of crystals, $n^o/M_T$; growth rate, G; total number of crystals/unit volume, $N_T$; and average population size, $\overline{L}_{1,O}$.

Further, the manipulated process variables to be controlled by the on-line apparatus in various embodiments include:

fines removal rate, M1 (or/$Q_F$);
solvent addition rate, M2;
feed addition rate, M3;
area of the fines baffle settler, M4;
agitator RPM, M6:
chemical modifiers, M7; and
seed addition, M8.

For example, the control of nuclei density $n^o$ is less desirable than the control of the parameter $n^o/M_T$ since the measurement of $n^o$ alone to modify crystallizer process parameters may drive the system into error as compared to optimum operation. The control of the crystallizer by maintaining a predetermined nuclei density $n^o$ is accurate only if the slurry density $M_T$ of the crystallizer is relatively constant; i.e. without knowing the slurry density $M_T$ of the crystallizer, the on-line control arrangement would be operating on incomplete information and on an incorrect assumption of system process behavior control. The slurry density $M_T$ of the crystallizer is measured from a slurry analyzer 104 (FIG. 1) sampling the contents of the crystallizer tank 10.

In order to calculate the desired changes to be made in the command signals of the manipulated process variables M1–M8, various time averaging of the calculated controlled process variables such as $B^o$ and G is thought to be desirable to avoid instabilities and erroneous command signal changes as might be caused by abrupt changes in the command signals, due to the time lag or dynamic response time in the calculated controlled process variable $B^o$ and G. For example, a weighted running average technique in the compute/processor stage 72 or in the control signal and output stage 76 is the recommended approach according to the relationship:

$$G_c = G_{n-1} + 2G_n + G_{n+1} \qquad (4)$$

where $G_c$ is the calculated dynamic controlled variable to be utilized to determine changes to be performed in the commanded manipulated process variables M1–M8, $G_{n-1}$ in the previously calculated controlled variable, $G_n$ is the current calculated controlled variable and $G_{n+1}$ is the next succeeding calculated controlled variable. Thus, while the on-line control apparatus of the present invention is operated on a current real-time basis, in specific embodiments, various time weighted running averages such as described by relationship (4), for example, are utilized on an on-line control basis but with a calculation time lag being introduced between the time of calculating a controlled variable process parameter and the time of issuance of a command signal based on the currently calculated controlled process parameter.

In accordance with further important aspects of the present invention (FIG. 1), a sample of the output of the dissolver 22 is routed by means of a control valve 106 to the sample particle analyzer 36 to measure the operation of the dissolver 22 and the extent to which the dissolver 22 is effective in achieving the desired predetermined dissolving characteristics in the fines removal loop. Further, the dissolved fines output of the dissolver can be utilized to provide a background sample to the sample particle analyzer 36 to obtain a background reference level of non-crystalline particulate matter to which the particle analyzer 36 responds as data (assuming total dissolving of the dissolver 22). The sample analyzer 36 (FIG. 2) includes a background input to a subtract background stage to allow the particle analyzer 36 to subtract the background error and correct the data output 50 so as to be free of background bias. Further, the background reference may be accomplished in another specific embodiment by the addition of dilution solvent at the input 108 and by operation of the control valve 110 to the sample stream.

For example, the sample stream is diluated by water from input 108 with a 5% factor of dilution water to provide complete dissolving of all crystal particles in the sample stream. The particle analyzer 36 may be programmed internally or by the compute/process stage 72 to initiate a background count function at predetermined intervals; for example after every ten counts of sample analysis. The control valve 112 is provided and controlled to block sample stream flow when the control valve 106 is controlled to supply the output of the dissolved 22 for background reference analysis. The valves 106, 110 and 112 are controlled either by the particle analyzer 36 or the compute/processor stage 72.

For purposes of directly monitoring the dissolving characteristics of the fines dissolver 22, in a specific embodiment a fines sample from the fines input to the dissolver is compared with the output of the dissolver 22. This is advantageous when the sample stream 28 includes conditioning and classifying with a cut size below that of the fines removal stream 20.

In accordance with important aspects of the preferred embodiment of the present invention, the analysis of particle data to determine the population values n by the compute/processor stage 72 utilizes the size ranges of 37-125 mm for a potassium chloride crystallizer with product crystals in the range of 1000-1500 mm. It is believed that a crystallizer with a product crystal size in the range of 200-300 mm should optimumly utilize the 10-40 mm particle size ranges for the data analysis to compute process parameters. Thus, in a general relationship it has been found that data analysis should utilize particle size ranges of approximately 10-15% of the average product size. Further, the cut size of the conditioned, classified sample particle stream is also varied in accordance with the crystal product size.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed as new and desired to be secured by Letters Patent of the United States is:

1. Control apparatus for controlling dynamic operating parameters of a crystallizer process having a crystallizer tank containing a body of slurry including crystal particles and liquid, the crystallizer process including the removal from the tank of crystal product having an average product size, said control apparatus comprising:

sample conditioning means for providing a sample stream of crystalline particle population in a predetermined range of particle sizes from said crystallizer tank by substantially excluding particles of a size larger than a predetermined fraction of the average product size in the crystallizer process; said sample stream having a particle concentration less than a predetermined maximum;

particle analyzing means responsive to said sample stream for outputting particle distribution data of said sample stream;

on-line process parameter estimation means responsive to selected particle distribution data from said particle analyzing means for calculating at least one dynamic process parameter of said crystallizer process based on a selected size range of particles in said particle distribution data, said on-line process parameter estimation means selecting said particle distribution data from said particle analyzing means in accordance with a predetermined relationship to include particle size data that is unaffected by the sample conditioning means and representing particle size data having at least a predetermined minimum volume fraction of the conditioned sample stream particles;

control signal developing means responsive to said dynamic process parameter of said on-line parameter estimation means for developing a command signal representing a predetermined manipulated process variable of said crystallizer process; said predetermined manipulated variable having a predetermined relationship to and effect on said dynamic process parameter; and manipulated variable control means responsive to said command signal for controlling said predetermined manipulated process variable of said crystallizer process, wherein said control apparatus is effective to maintain said dynamic process parameter within a predetermined operational process range during continuous operation of said crystallizer process.

2. The control apparatus of claim 1 wherein said on-line process parameter estimation means calculates said dynamic process parameter from said selected size ranges of said particle distribution data, each of said selected size ranges including at least 3% of the total particle mass of the sample stream.

3. The control apparatus for claim 2 wherein said sample conditioning means includes a sample conditioner for substantially excluding particle sizes larger than a predetermined maximum cut size and said selected size ranges of said particle distribution data utilized to calculate said dynamic process parameter are selected by starting with the highest particle size range unaffected by the cut size of said sample conditioner and excluding all lower particle size ranges starting with the first lower particle size range that included less than 3% of the total particle mass of the conditioned sample stream.

4. The control apparatus of claim 1 wherein said particle analyzing means comprises a light scattering analyzer.

5. The control apparatus of claim 1 wherein said dynamic process parameter is the ratio of the nuclei density $n^o$ divided by the slurry density $M_T$ of the crystals in the crystallizer tank.

6. The control apparatus of claim 1 wherein said on-line process parameter estimation means calculates said dynamic process parameter by obtaining the population density n of said selected number of particle size ranges $L_l$-$L_m$ from said particle distribution data, calculating the best-fit straight line of the natural log of the values of n for the particle size ranges $L_l$-$L_m$, and extrapolating said best-fit straight line to obtain $n^o$ the nuclei density, $B^o$ the nucleation rate and G the growth factor.

7. The control apparatus of claim 5 wehrein said crystallizer process includes a solvent dissolver and a fines removal loop withdrawn from said crystallizer tank and connected through said solvent dissolver and back to said crystallizer tank, and said manipulated process variable is the solvent addition rate of about solvent dissolver.

8. The control apparatus of claim 1 wherein said crystallizer process includes a fines removal loop and said on-line process estimation means calculates the growth rate G of the crystallizer process and further calculates the fines residence time $T_F$ of the crystallizer process.

9. The control apparatus of claim 8 wherein said on-line process parameter estimation means comprises means responsive to said calculated fines residence time $T_F$ for providing a modified fines residence parameter $T_F^1$ incorporating a first order response characteristic to allow the crystallizer process to respond to changes in the growth rate G before the calculated growth rate G is updated.

10. The control apparatus of claim 1 wherein said on-line parameter estimation means comprises means responsive to a predetermined number of successive calculated dynamic process parameter calculations to provide a time-weighted running average of said dynamic process parameter based on a predetermined time-weighted relationship of said predetermined number of successive calculated dynamic process parameters.

11. A method for controlling the dynamic operating parameters of a crystallizer having a crystallizer tank containing a body of slurry including crystal particles and liquid, the crystallizer also including a crystal product removal arrangement of crystal product having an average product size said method comprising:
obtaining a conditioned sample stream of crystalline particle population in a predetermined range of particle sizes from said crystallizer tank smaller than a predetermined fraction of the average product size;
analyzing said sample stream to obtain particle distribution data of said sample stream;
calculating at least one dynamic process parameter of said crystallizer based on size ranges of particles in said particle distribution data unaffected by the conditioning of the sample stream and representing particle size ranges having at least a predetermined minimum volume fraction of the conditioned sample stream particles;
developing a command signal representing a predetermined manipulated process variable of said crystallizer having a predetermined relationship to and effect on said dynamic process parameter; and
controlling said predetermined manipulated process variable of said crystallizer in accordance with said command signal to maintain said dynamic process parameter within a predetermined operational process range during continuous operation of said crystallizer.

12. The method of claim 11 wherein said calculating step further comprises selecting said particle distribution data by starting with the largest particle size range that is unaffected by the sample stream conditioning and excluding all lower particle size ranges starting with the first lower particle size range that includes less than 3% of the total particle mass of the sample stream.

13. The control apparatus of claim 1 wherein said crystallizer process includes a fines dissolver and a fines removal loop withdrawn from said crystallizer tank and connected through said fines dissolver and back to said crystallizer tank, said crystallizer process having a fines residence time $T_F$ that is substantially less than the product residence time $T_P$, said on-line process parameter estimation means calculating said dynamic process parameter on the basis of a steady-state condition of said crystallizer process.

14. The method of claim 11 wherein said crystallizer includes a fines dissolver and a fines removal loop withdrawn from the crystallizer tank and connected through said dissolver and back to said crystallizer tank, said crystallizer having a fines residence time $T_F$ that is substantially less than the product residence time $T_P$, said calculating step calculating said dynamic process parameter on the basis of a steady-state condition of said crystallizer.

15. The control apparatus of claim 1 wherein said on-line process parameter estimation means utilizes particle distribution data with size ranges less than approximately 10–15% of the average product size to calculate said dynamic process parameter.

16. The method of claim 11 wherein said calculating step utilizes particle distribution data with size ranges less than approximately 10–15% of the average product size to calculate said dynamic process parameter.

17. Control apparatus for controlling dynamic operating parameters of a crystallizer process having a crystallizer tank containing a body of slurry including crystal particles and liquid, the crystallizer process including the removal from the tank of crystal product having an average product size, said control apparatus comprising:
sample conditioning means for providing a conditioned sample stream of crystalline particle population in a predetermined range of particle sizes from said crystallizer tank;
particle analyzing means responsive to said sample stream for outputting particle distribution data of said sample stream;
on-line process parameter estimation means responsive to selected particle distribution data from said particle analyzing means for calculating at least one dynamic process parameter of said crystallizer process based on selected size ranges of particles in said particle distribution data, said on-line process parameter estimation means selecting said particle distribution data from said particle analyzing means in accordance with a predetermined relationship to include particle size data that is unaffected by the sample conditioning means and to include particle size ranges less than approximately 10–15% of the average product size;
control signal developing means responsive to said dynamic process parameter of said on-line parameter estimation means for developing a command signal representing a predetermined manipulated process variable of said crystallizer process; said predetermined manipulated variable having a predetermined relationship to and effect on said dynamic process parameter; and manipulated variable control means responsive to said command signal for controlling said predetermined manipulated process variable of said crystallizer process, wherein said control apparatus is effective to maintain said dynamic process parameter within a predetermined operational process range during continuous operation of said crystallizer process.

18. The control apparatus of claim 17 wherein said on-line process parameter estimation means further selects said particle distribution data by excluding all lower particle size ranges starting with the first lower particle size range that includes less than a predetermined percentage of the total particle mass of the conditioned sample stream.

19. A method for controlling the dynamic operating parameters of a crystallizer having a crystallizer tank containing a body of slurry including crystal particles and liquid, the crystallizer also including a crystal product removal arrangement of crystal product having an average product size and a fines removal loop, the fines residence time being substantially less than the product residence time, said method comprising:

obtaining a sample stream of crystalline particle population in a predetermined range of particle sizes from said crystallizer tank;

analyzing said sample stream to obtain particle distribution data of said sample stream;

calculating at least one dynamic process parameter of said crystallizer based on a predetermined size range of particles in said particle distribution data and based on a steady-state condition of said crystallizer before a steady state has been reached by said crystallizer, during the steady state, and during transient conditions after a steady-state condition has been reached by the crystallizer apparatus, said predetermined size range of particles including particle sizes less than approximately 10–15% of the average product size;

developing a command signal representing a predetermined manipulated process variable of said crystallizer having a predetermined relationship to and effect on said dynamic process parameter; and controlling said predetermined manipulated process variable of said crystallizer in accordance with said command signal to maintain said dynamic process parameter within a predetermined operational process range during continuous operation of said crystallizer.

* * * * *

UNITED STATES PATENT AND TRADEMARK OFFICE
CERTIFICATE OF CORRECTION

PATENT NO. : 4,263,010
DATED : April 21, 1981
INVENTOR(S) : Alan D. Randolph

It is certified that error appears in the above-identified patent and that said Letters Patent are hereby corrected as shown below:

Column 14, claim 3, line 59, the word "included" should be changed to read --includes--.

Column 15, claim 7, line 16, delete the word "about" and insert --said--.

Signed and Sealed this

Twenty-eighth Day of July 1981

[SEAL]

Attest:

GERALD J. MOSSINGHOFF

Attesting Officer     Commissioner of Patents and Trademarks